(12) United States Patent
Mun (10) Patent No.: US 11,218,212 B1
(45) Date of Patent: Jan. 4, 2022

(54) METHOD AND APPARATUS FOR PERFORMING WIRELESS COMMUNICATION THROUGH CHANNEL STATE PREDICTION USING LOCAL DYNAMIC MAP

(71) Applicant: Industry-Academic Cooperation Foundation, KOREA NATIONAL UNIVERSITY OF TRANSPORTATION, Chungju-si (KR)

(72) Inventor: Cheol Mun, Yongin-si (KR)

(73) Assignee: Industry-Academic Cooperation Foundation, KOREA NATIONAL UNIVERSITY OF TRANSPORTATION, Chungju-si (KR)

( * ) Notice: Subject to any disclaimer, the term of this patent is extended or adjusted under 35 U.S.C. 154(b) by 0 days.

(21) Appl. No.: 17/093,294

(22) Filed: Nov. 9, 2020

(30) Foreign Application Priority Data

Nov. 9, 2020 (KR) ........................ 10-2020-0148222

(51) Int. Cl.
*H04B 7/06* (2006.01)
*H04B 17/13* (2015.01)
*H04W 72/04* (2009.01)

(52) U.S. Cl.
CPC ........... *H04B 7/0695* (2013.01); *H04B 17/13* (2015.01); *H04W 72/046* (2013.01); *H04W 72/048* (2013.01)

(58) Field of Classification Search
CPC ............. H04W 64/006; H04W 72/048; H04W 72/085; H04W 4/46; H04W 4/44;
(Continued)

(56) References Cited

U.S. PATENT DOCUMENTS

| 10,530,451 | B1 * | 1/2020 | Bansal | ............... H04W 4/40 |
| 2016/0056904 | A1 * | 2/2016 | Sakaguchi | .......... H04W 72/085 370/252 |

(Continued)

OTHER PUBLICATIONS

View on 5G Architecture, 5G PPP Architecture Working Group, Version 3.0, Jun. 2019 (Year: 2019).*

(Continued)

*Primary Examiner* — Aristocratis Fotakis
(74) *Attorney, Agent, or Firm* — Studebaker & Brackett PC (57) ABSTRACT

Provided are a method and apparatus for performing wireless communication through channel state prediction using a local dynamic map. The method may include (a) receiving probe node data (PND) of a base station node and a mobile node, (b) generating local dynamic map (LDM) information including communication network information between the base station node and the mobile node using the probe node data, and (c) transmitting the LDM information to the base station node and the mobile node, wherein the LDM information may be used to select a transmission beam of the base station node and a reception beam of the mobile node corresponding to the transmission beam or a reception beam of the base station node and a transmission beam of the mobile node corresponding to the reception beam.

14 Claims, 9 Drawing Sheets

(58) Field of Classification Search
CPC ..... H04W 4/40; H04B 17/309; H04B 7/0695; H04B 7/0617
See application file for complete search history.

(56) References Cited

U.S. PATENT DOCUMENTS

| | | | | |
|---|---|---|---|---|
| 2019/0253900 | A1* | 8/2019 | Narasimha | H04W 16/28 |
| 2019/0323855 | A1* | 10/2019 | Mahler | G01S 7/4808 |
| 2020/0128591 | A1* | 4/2020 | Subramanian | H04L 5/0037 |
| 2020/0296609 | A1* | 9/2020 | Rayavarapu | H04W 24/08 |
| 2020/0336194 | A1* | 10/2020 | Karjalainen | H04L 5/0044 |
| 2021/0243744 | A1* | 8/2021 | Barbu | H04W 72/046 |

OTHER PUBLICATIONS

Zongdian Li, Tao Yu, Ryuichi Fukatsu, Gia Khanh Tran, Kei Sakaguchi, "Proof-of-Conceptof a SDN Based mmWave V2X Network for Safe Automated Driving", Tokyo Institute of Technology, Japan, IEEE, Dec. 2019 (Year: 2019).*

Koslowski et al., 5G-MiEdge, Millimeter-wave Edge Cloud as an Enabler for 5G Ecosystem, Jul. 2019 (Year: 2019).*

Jan Plachy, Zdenek Becvarand Emilio Calvanese Strinati, "Dynamic Resource Allocation Exploiting Mobility Prediction in Mobile Edge Computing", Czech Technical University in Prague, CEA-Leti, 2016 IEEE 27th Annual IEEE International Symposium on Personal, Indoor and Mobile Radio Communications (Year: 2016).*

Sakaguchi et al, "Where, When, and How mmWave is Used in 5G and Beyond", IEICE Transactions on Electronics, Apr. 2017 (Year: 2017).*

Gek Hong Sim, Sabrina Klos, Arash Asadi, Anja Klein, Matthias Rollick, "An Online Context-aware Machine Learning Algorithm for 5G mmWave Vehicular Communications", Secure Mobile Networking lab (SEEMOO), Technische Universität Darmstadt, IEEE/ACM Transactions on Networking, Sep. 26, 2018 (Year: 2018).*

* cited by examiner

METHOD AND APPARATUS FOR PERFORMING WIRELESS COMMUNICATION THROUGH CHANNEL STATE PREDICTION USING LOCAL DYNAMIC MAP

CROSS-REFERENCE TO RELATED APPLICATION

This application claims priority under 35 U.S.C § 119 to Korean Patent Application No. 10-2020-0148222 filed on Nov. 9, 2020 in the Korean Intellectual Property Office, the entire contents of which are hereby incorporated by reference.

BACKGROUND

1. Field of the Invention

The present invention relates to a method and apparatus for ultra-low-latency, high-reliability wireless communication, and more particularly, to a method and apparatus for performing wireless communication through channel state prediction using a local dynamic map.

2. Discussion of Related Art 5G mobile communication technology includes ultra-reliable and low-latency communication (URLLC) technology to support services such as autonomous driving or a smart factory.

5G URLLC aims to have a reliability of 99.999% (5-nine) or more and a transmission latency of 1 ms or less. Therefore, 5G URLLC has very different performance targets from enhanced Mobile-BroadBand (eMBB), which aims for broadband data transfer with a rate of up to 20 Gbps, and massive Machine-Type Communications (mMTC), which connects more than one million IoT devices per 1 km².

Unlike eMBB and mMTC, which have been previously developed as 5G communication technologies, URLLC has been developed recently because this technology requires a high technical difficulty level. In addition, a standard for proposing a framework such as waveforms and channel structures for New Radio-based URLLC communication using millimeter-wave band in 3GPP Rel.16 was completed in July 2020. Therefore, it is necessary to develop a specific communication technology that can achieve a high-reliability, low-latency performance target on the basis of the corresponding framework.

SUMMARY OF THE INVENTION

The present invention has been created to solve the above-described problems and is directed to providing a method and apparatus for performing wireless communication through channel state prediction using a local dynamic map.

Also, the present invention is directed to providing a method and apparatus for predicting a channel and selecting an optimal transmission/reception beam using local dynamic map (LDM) information including communication network information between a base station node and a mobile node.

Also, the present invention is directed to providing a method and apparatus for transmitting data with high reliability and low latency by computing a reflective path configurable by an intelligent reflecting surface (IRS) and performing channel reconfiguration using LDM information including communication network information between a base station node and a mobile node.

The present invention is not limited to the above objectives, but other objectives not described herein may be clearly understood by those skilled in the art from the following description.

In order to achieve the above objectives, according to an aspect of the present invention, there is provided a method of performing wireless communication through channel state prediction using a local dynamic map, the method including (a) receiving, by a edge node, probe node data (PND) of a base station node and a mobile node, (b) generating, by a edge node, local dynamic map (LDM) information including communication network information between the base station node and the mobile node using the probe node data, and (c) transmitting the LDM information to the base station node and the mobile node, wherein the LDM information may be used to select a transmission beam of the base station node and a reception beam of the mobile node corresponding to the transmission beam or a reception beam of the base station node and a transmission beam of the mobile node corresponding to the reception beam.

In an embodiment, the probe node data may include at least one of location information, direction information, and speed information of the base station node and the mobile node and at least one of number information, direction information, and gain information of a candidate transmission beam of the base station node and a candidate reception beam of the mobile node.

In an embodiment, operation (b) may include generating a radio map displaying locations and movement trajectories of the base station node and the mobile node and geographical signal power spectrum density caused by beamforming of the base station node and the mobile node using the probe node data, generating a beam graph including transmission/reception beam combination information and communication link state information for the transmission/reception beam combination information using the radio map; and generating LDM information including the radio map and the beam graph.

In an embodiment, the LDM information may comprise static information comprising 3D precision map and dynamic information comprising moving state of moving objects and may be updated according to a predetermined time cycle.

In an embodiment, the method may further include, after operation (c), determining locations and movement trajectories of the base station node and the mobile node using the probe node data, predicting blocking of a line-of-sight (LOS) path between the base station node and the mobile node on the basis of the locations and the movement trajectories, and updating the LDM information on the basis of the predicted blocking of the LOS path.

In an embodiment, the updated LDM information may be used to select a reconfigured transmission beam of the base station node to a reflective node, a reception beam of the reflective node corresponding to the reconfigured transmission beam, and a reconfigured reception beam of the mobile node corresponding to the transmission beam of the reflective node.

In an embodiment, the updated LDM information may be used to select a reconfigured transmission beam of the mobile node to a reflective node, a reception beam of the reflective node corresponding to the reconfigured transmission beam, and a reconfigured reception beam of the base station node corresponding to the transmission beam of the reflective node.

According to another aspect of the present invention, there is provided an apparatus for performing wireless communication through channel state prediction using a local dynamic map, the apparatus including a communication unit configured to receive probe node data (PND) of a base station node and a mobile node, and a control unit configured to generate local dynamic map (LDM) information including communication network information between the base station node and the mobile node using the probe node data, wherein the communication unit may transmit the LDM information to the base station node and the mobile node, and the LDM information may be used to select a transmission beam of the base station node and a reception beam of the mobile node corresponding to the transmission beam or a reception beam of the base station node and a transmission beam of the mobile node corresponding to the reception beam.

In an embodiment, the probe node data may include at least one of location information, direction information, and speed information of the base station node and the mobile node and at least one of number information, direction information, and gain information of a candidate transmission beam of the base station node and a candidate reception beam of the mobile node.

In an embodiment, the control unit may be configured to generate a radio map displaying locations and movement trajectories of the base station node and the mobile node and geographical signal power spectrum density caused by beamforming of the base station node and the mobile node using the probe node data, generate a beam graph including transmission/reception beam combination information and communication link state information for the transmission/reception beam combination information using the radio map, and generate LDM information including the radio map and the beam graph.

In an embodiment, the LDM information may comprise static information comprising 3D precision map and dynamic information comprising moving state of moving objects and may be updated according to a predetermined time cycle.

In an embodiment, the control unit may determine locations and movement trajectories of the base station node and the mobile node using the probe node data, predict blocking of a line of sight (LOS) path between the base station node and the mobile node on the basis of the locations and the movement trajectories, and update the LDM information on the basis of the predicted blocking of the LOS path.

In an embodiment, the updated LDM information may be used to select a reconfigured transmission beam of the base station node to a reflective node, a reception beam of the reflective node corresponding to the reconfigured transmission beam, and a reconfigured reception beam of the mobile node corresponding to the transmission beam of the reflective node.

In an embodiment, the updated LDM information may be used to select a reconfigured transmission beam of the mobile node to a reflective node, a reception beam of the reflective node corresponding to the reconfigured transmission beam, and a reconfigured reception beam of the base station node corresponding to the transmission beam of the reflective node.

Details for achieving the above objectives will become apparent with reference to embodiments to be described below in detail together with the accompanying drawings.

However, the present invention is not limited to the following embodiments, but embodied in different forms. Rather, these embodiments are provided so that this disclosure will be thorough and complete and will fully convey the scope of the present invention to those skilled in the art (hereinafter referred to "typical technicians").

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Since the present invention may be variously modified and have several exemplary embodiments, specific exemplary embodiments will be shown in the accompanying drawings and described in detail.

Various features of the present invention disclosed in the claims may be better understood in view of the drawings and the detailed description. Apparatuses, methods, manufacturing methods, and various embodiments disclosed herein are provided for the purpose of illustration. The disclosed structural and functional features are intended to enable those skilled in the art to specifically practice various embodiments and are not intended to limit the scope of the invention. The disclosed terms and sentences are intended to explain various features of the disclosed invention in an easy-to-understand manner and are not intended to limit the scope of the invention.

In the following description of the present invention, detailed descriptions of related well-known techniques will be omitted if it is determined that the detained descriptions may unnecessarily obscure the subject matter of the present invention.

Hereinafter, a method and apparatus for performing wireless communication through channel state prediction using local dynamic map (LDM) information according to an embodiment of the present invention will be described.

Figure 1A:
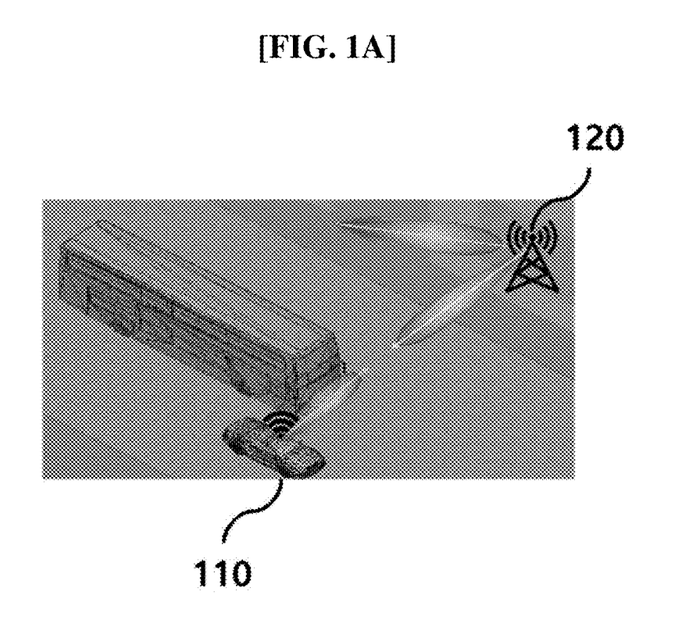
FIGS. 1A and 1B are diagrams showing a conventional wireless communication method.
Figure 1B:
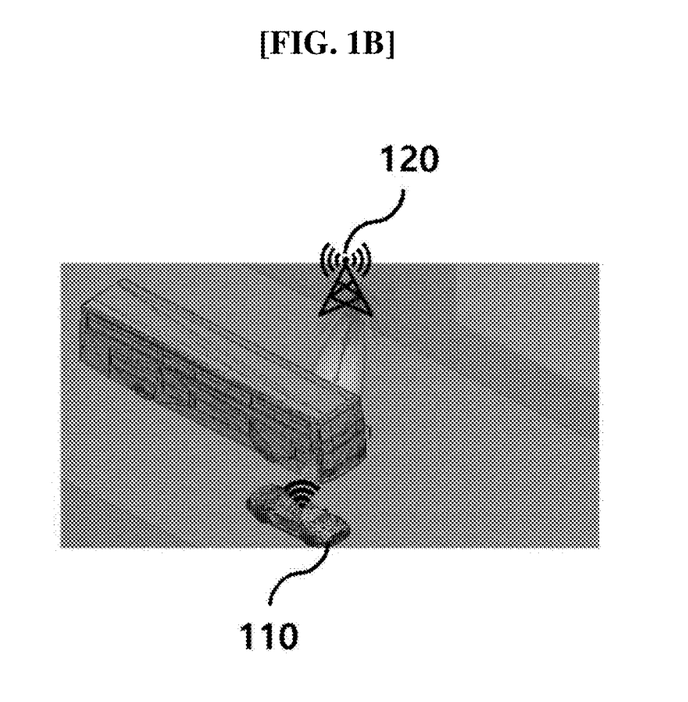

FIGS. 1A and 1B are diagrams showing a conventional wireless communication method.

Referring to FIG. 1A, it can be seen that in a line of sight (LOS) path between a base station node 120 and a mobile node 110, signals are transmitted or received by the beamforming of the base station node 120 and the beamforming of the mobile node 110.

Conventionally, referring to FIG. 1B, when an obstacle object (e.g., a large vehicle) suddenly intervenes between the base station node 120 and the mobile node 110, the dynamic obstacle object causes the LOS path between the base station node 120 and the mobile node 110 to suddenly transition to a non-line-of-sight (NLOS) path, and thus beams formed between the base station node 120 and the mobile node 110 may be blocked by the dynamic obstacle object.

In this case, since propagation in a millimeter-wave band has very large losses due to reflection, diffraction, and scattering, it may be impossible to transmit signals through the NLOS path.

Accordingly, when the LOS path is blocked, a communication link previously formed between the base station node 120 and the mobile node 110 may be suddenly disconnected.

When such a situation occurs, significant time latencies and errors are generated due to the recovery of the disconnected link in the related art, and thus high-reliability low-latency performance required by 5G ultra-reliable and low-latency communication (URLLC) cannot be satisfied. Therefore, for 5G URLLC, there is a need for a communication technology capable of predicting and avoiding unexpected channel distortion such as LOS path blocking between the base station node 120 and the mobile node 110.

Referring to FIG. 1B, conventionally, the base station node 120 may transmit a pilot symbol and a data symbol at the same time, and the mobile node 110 may estimate channel distortion (channel state) having occurred in the data symbol by applying a least square (LS) channel estimation technique to a received pilot symbol.

According to such a conventional technology, when the LOS path blocking occurs between the base station node 120 and the mobile node 110, the mobile node 110 can only subsequently estimate that the LOS path blocking has occurred by applying the LS channel estimation to the pilot symbol. Accordingly, in the related art, it is not possible to predict a channel state between the base station node 120 and the mobile node 110.

Also, in the related art, the base station node 120 uses frequency and time resources to transmit a pilot symbol. In the case of massive MIMO in which hundreds of antennas are used by the transmitting node 120, a signal transmitted from each transmitting antenna experiences a different channel state, and thus the base station node 120 should transmit a pilot symbol using different frequency and time resources for each transmitting antenna in order to estimate the channel state. For this reason, excessive frequency and time resources are required, and data symbol transmission efficiency is lowered.

Therefore, in order to overcome the limitations of the related art, according to the present invention, a channel prediction technique capable of predicting channel state information without using frequency and time resources and a high-reliability low-latency communication technology using the technique will be described below.

Figure 2:
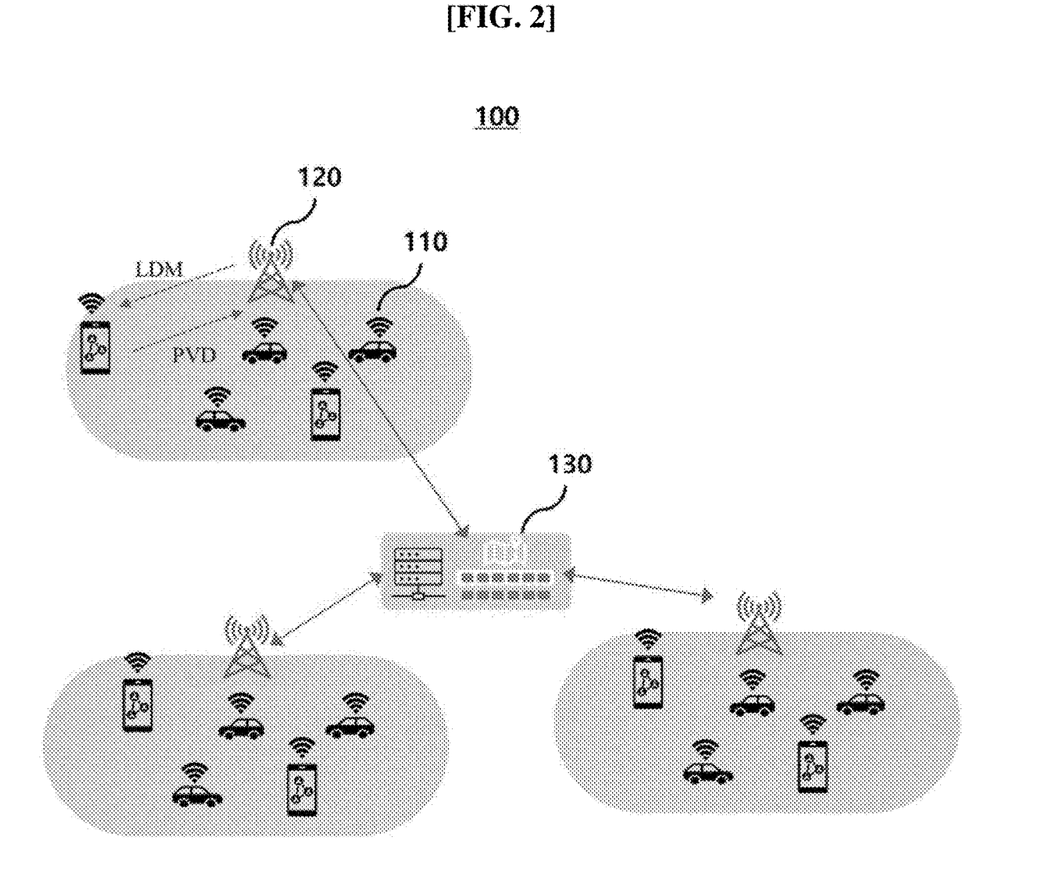
FIG. 2 is a diagram showing a wireless communication system according to an embodiment of the present invention.

FIG. 2 is a diagram showing a wireless communication system 100 according to an embodiment of the present invention.

Referring to FIG. 2, the wireless communication system 100 may include at least one mobile node 110, at least one base station node 120, and an edge node 130.

The mobile node 110 may transmit probe node data (PND) including movement state information and communication system information to an adjacent base station node 120.

In an embodiment, the movement state information may include at least one of location information, direction information, and speed information of the mobile node 110.

In an embodiment, the communication system information may include at least one of number information, direction information, and gain information of a candidate transmission beam of the base station node 120 and a candidate reception beam of the mobile node 110.

The base station node 120 may forward the probe node data to the edge node 130. The edge node 130 may generate LDM information using the probe node data.

Also, the edge node 130 may broadcast the LDM information to multiple base station nodes 120 and multiple mobile nodes 110 which belong to a service area.

Subsequently, the base station node 120 and the mobile node 110 may predict a channel state between the base station node 120 and the mobile node 110 using the LDM information, select a transmission beam and a reception beam to provide an optimal channel state between the base station node 120 and the mobile node 110, and transmit and receive data with high reliability and low latency.

Also, the edge node 130 may predict an abrupt channel state such as LOS path blocking between the base station node 120 and the mobile node 110 using beam graphs and movement state information of dynamic objects included in the LDM information.

Also, the edge node 130 may transmit data with high reliability and low latency by computing a reflective path, which can be configured by an intelligent reflecting surface (IRS), and performing channel reconfiguration using the beam graphs and movement state information of the dynamic objects included in the LDM information.

For example, the mobile node 110 may include various mobile terminals such as a mobile terminal of a pedestrian, a mobile terminal of a vehicle, and the like. The base station node 120 may include a base station and small cell base station. The edge node 130 may be referred to as Multi-Access Edge Computing (MEC) or terms with equivalent technical meaning.

Figure 3:
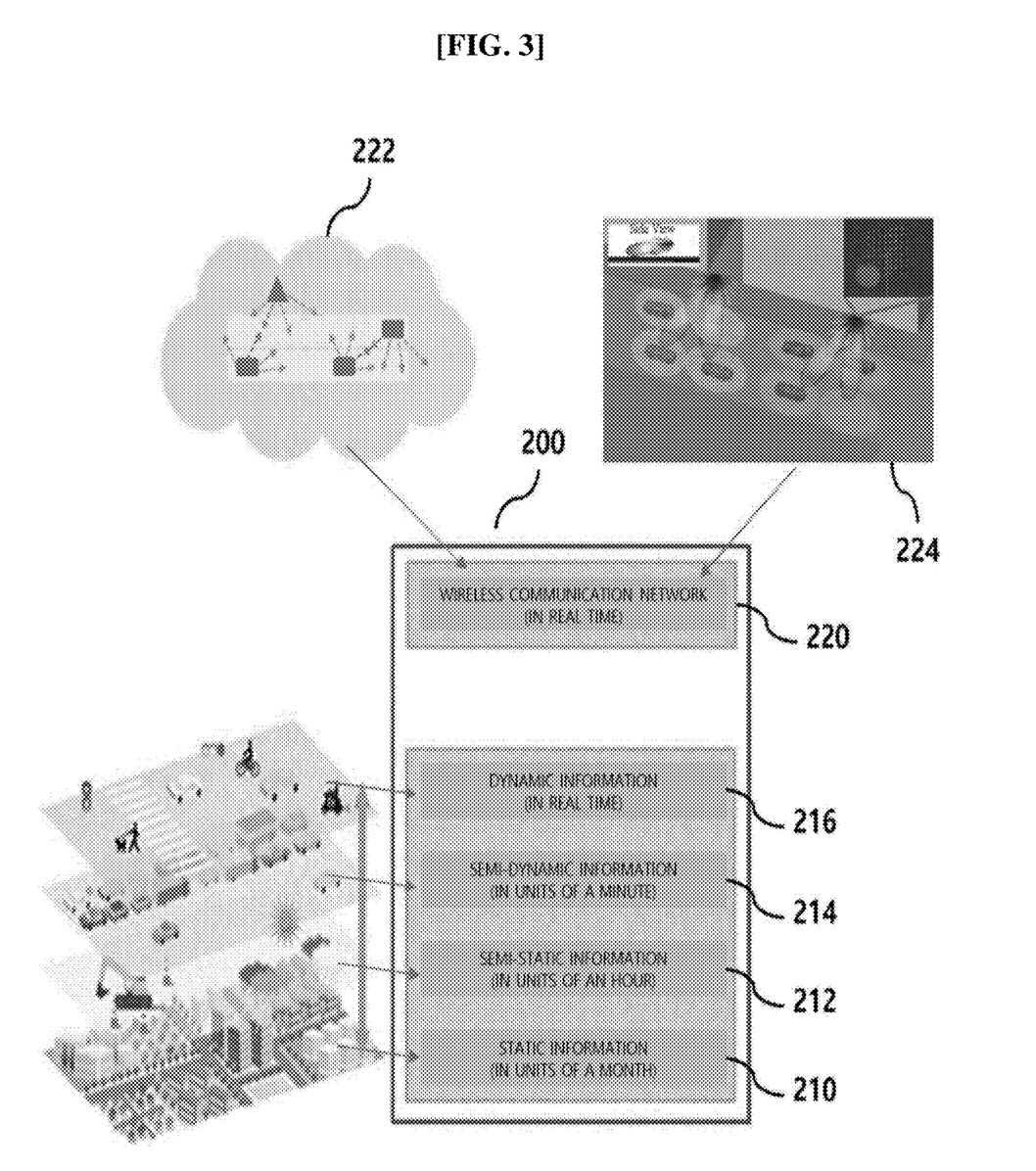
FIG. 3 is a diagram showing local dynamic map (LDM) information according to an embodiment of the present invention.

FIG. 3 is a diagram showing LDM information 200 according to an embodiment of the present invention.

Referring to FIG. 3, the LDM information 200 may include a radio map 222 displaying the locations of multiple base station nodes 120 and receiving modes 110 and the geographical signal power spectrum density caused by massive MIMO beamforming of the base station nodes 120 and the mobile nodes 110 and a beam graph 224 including a list of transmission/reception beam combinations usable for connections between the multiple base station nodes 120 and mobile nodes 110, communication link state information for the combinations, etc.

Also, the LDM information 200, which is a concept defined in an international standard (e.g., ISO 18750, ETSI 302 895), may standardize and express information related to a vehicle and a situation on a road on the basis of a spatial location and an effective period.

The LDM information 200 may further include a static layer 210 that is changed or updated on a monthly basis, a semi-static layer 212 that is changed or updated on an hourly basis, a semi-dynamic layer 214 that is changed or updated on a minute basis, and a dynamic layer 216 that is changed or updated on a second basis.

The dynamic layer 216 may include the location and size of a mobile node 110 that is fixed or moving in a service area and movement trajectory information such as a movement direction, speed, and acceleration.

Accordingly, for example, the LDM information 200 may include information such as traffic lights, signs, curbs, road marks, and various structures, as well as information such as buildings, road centerlines, and borders, displayed in a 3D digital high-precision map and may also include information such as the current locations, movement directions, and speeds of pedestrians and vehicles.

According to the present invention, new wireless communication network LDM information 200 may be formed by adding, to the LDM information 200, communication network information 220 including a radio map 222 displaying the locations, heights, and movement states (speed and direction) of multiple base station nodes 120 and receiving modes 110 and the geographical signal power spectrum density caused by massive MIMO beamforming of the base station nodes 120 and the mobile nodes 110 and a beam graph 224 including a list of usable transmission/reception beam combinations, communication link state information for the combinations, etc.

Figure 4A:
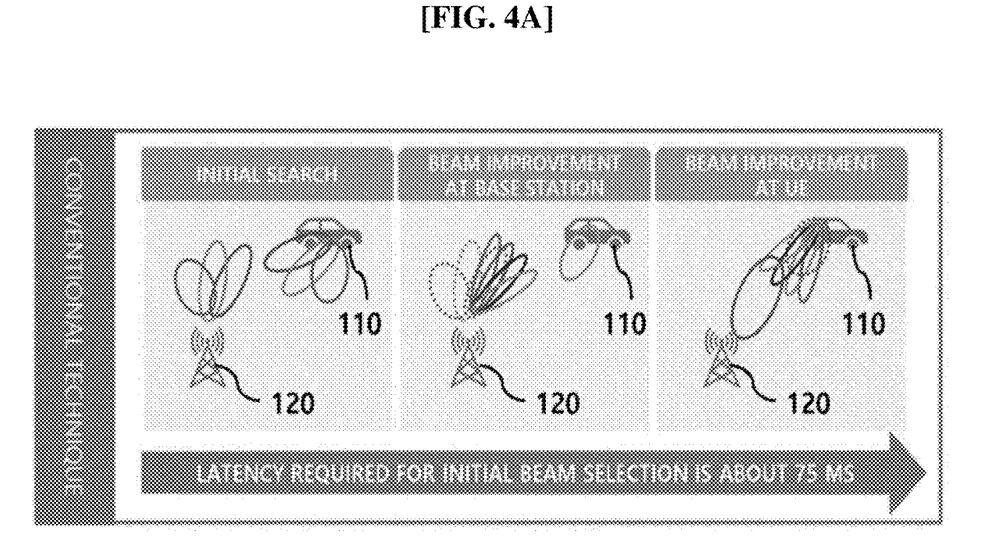
FIG. 4A is a diagram showing a conventional transmission/reception beam selection.
Figure 4B:
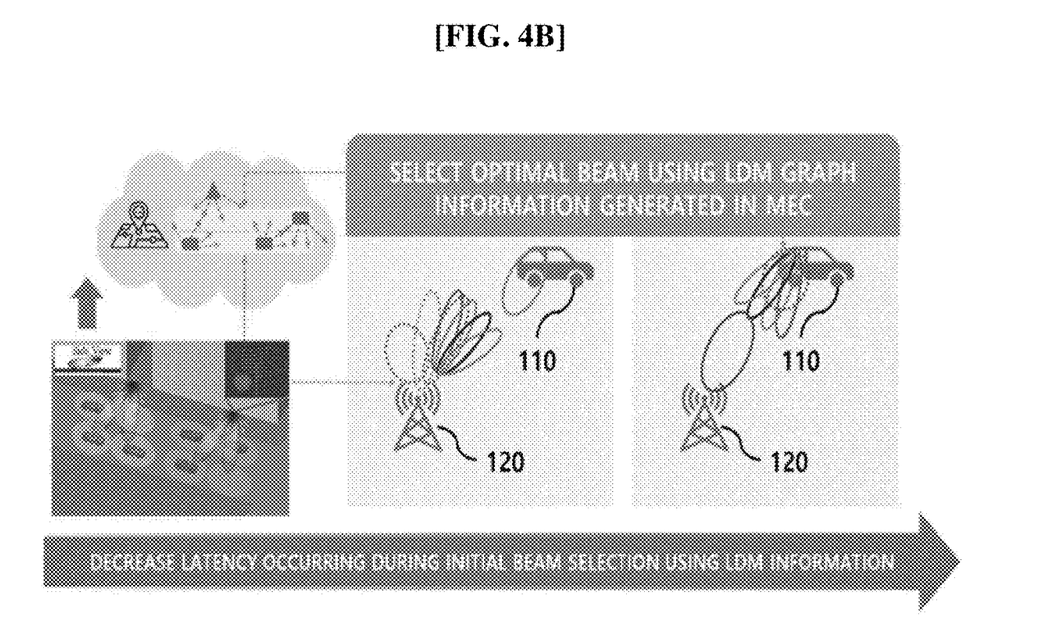
FIG. 4B is a diagram showing an optimal transmission/reception beam selection using LDM information according to an embodiment of the present invention.

FIG. 4A is a diagram showing a conventional transmission/reception beam selection. FIG. 4B is a diagram showing an optimal transmission/reception beam selection using LDM information according to an embodiment of the present invention.

Referring to FIG. 4, conventionally, a base station node 120 and a mobile node 110 sequentially perform an initial search using a synchronization signal when the base station node 120 uses 32 beams and the mobile node 110 uses eight beams.

Each of the base station node 120 and the mobile node 110 performs a beam selection process, and the whole process takes about 75 ms. Accordingly, latency performance required by 5G URLLC, i.e., a transmission latency of 1 ms or less, cannot be satisfied.

Referring to FIG. 4B, according to the present invention, a base station node 120 and a mobile node 110 may receive LDM information from an edge node 130 and predict a channel state between the base station node 120 and the mobile node 110 using a beam graph included in the LDM information and select a transmission beam and a reception beam that provides an optimal channel state between the base station node 120 and the mobile node 110, respectively, thereby transmitting and receiving data with high reliability and low latency.

Also, according to the present invention, an optimal transmission beam and an optimal reception beam to be used by the base station node 120 and the mobile node 110 may be selected using a beam graph included in the LDM information.

The base station node 120 may inquire about beam information usable for link connection to the corresponding mobile node 110 using the beam graph and may select the optimal transmission beam.

Subsequently, the corresponding mobile node 110 may select a reception beam that is optimally usable along with the transmission beam selected by the base station node 120.

Alternatively, the base station node 120 and the mobile node 110 may select an optimal combination of a transmission beam and a reception beam that is usable for link connection using the beam graph and may transmit data using the corresponding combination of the transmission beam and the reception beam.

Thus, it is possible to drastically reduce transmission latency caused by an initial beam selection to be performed upon initial connection and handoff.

Figure 5:
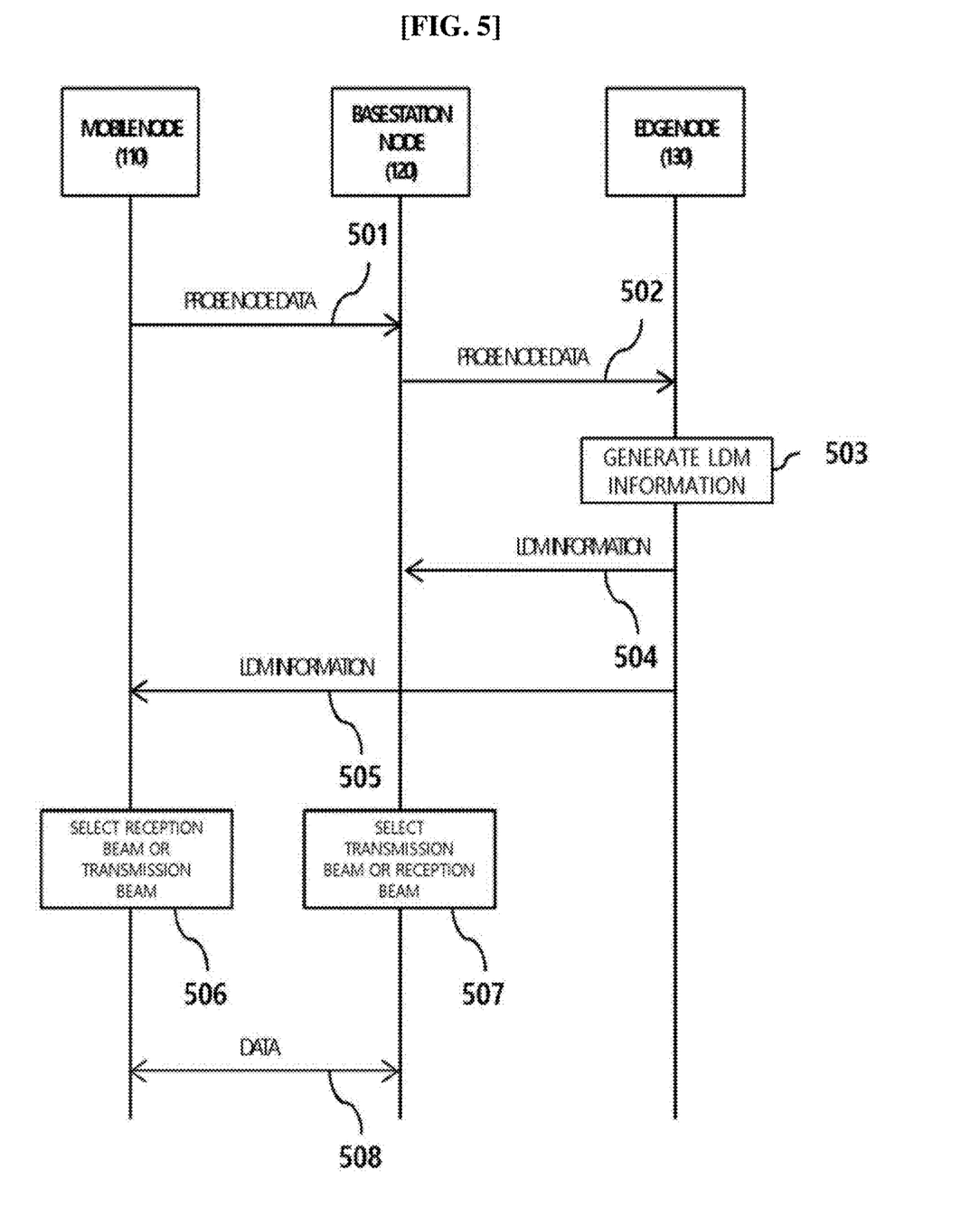
FIG. 5 is a diagram showing a signal flow for an optimal transmission/reception beam selection using LDM information according to an embodiment of the present invention.

FIG. 5 is a diagram showing a signal flow for an optimal transmission/reception beam selection using LDM information according to an embodiment of the present invention.

Referring to FIG. 5, in S501, a mobile node 110 may transmit probe node data of the mobile node 110 to a base station node 120. In an embodiment, the mobile node 110 may transmit the probe node data of the mobile node 110 to an edge node 130.

In S502, the base station node 120 may transmit the probe node data of the mobile node 110 and the base station node 120 to the edge node 130.

In S503, the edge node 130 may generate LDM information including communication network information between the base station node 120 and the mobile node 110 using the probe node data of the base station node 120 and the mobile node 110.

In an embodiment, the LDM information may include a radio map displaying the geographical signal power spectrum density caused by the beamforming of the base station node 120 and the mobile node 110 and a beam graph including transmission/reception beam combination information of the base station node 120 and the mobile node 110 and communication link state information for the transmission/reception beam combination information.

In an embodiment, the edge node 130 may analyze probe node data forwarded from multiple base station nodes 120 and generate the locations and movement trajectories of the multiple base station nodes 120 and mobile nodes 110 using the communication network information of the LDM information.

Also, the edge node 130 may generate a radio map displaying the geographical signal power spectrum density caused by beamforming of the base station node 120 and the mobile node 110 through a technique such as 3D ray tracing by using communication system information and the location information of the base station node 120 and the mobile node 110 included in the probe node data.

Also, the edge node 130 may generate a beam graph including a list of transmission/reception beam combinations usable for a connection between the base station node 120 and the mobile node 110 through a location-based prediction model of the base station node 120 and the mobile node 110, communication link state information for the combinations, etc. by using the radio map and the locations and movement trajectory information of the base station node 120 and the mobile node 110 included in the probe node data.

In S504, the edge node 130 may transmit the LDM information to the base station node 120. In S505, the edge node 130 may transmit the LDM information to the mobile node 110.

In S506, the mobile node 110 may select an optimal reception beam corresponding to a transmission beam to perform communication with the base station node 120 on the basis of the LDM information.

In S507, the base station node 120 may select an optimal transmission beam corresponding to a reception beam of the mobile node 110 to perform communication with the mobile node 110 on the basis of the LDM information or an optimal reception beam corresponding to a transmission beam of the mobile node 110.

In S508, the base station node 120 may transmit data to the mobile node 110 through the optimal transmission beam. In this case, the mobile node 110 may receive data through the optimal reception beam.

In some embodiments, the base station node 120 may receive data from the mobile node 110 through the optimal reception beam. In this case, the mobile node 110 may transmit data through the optimal transmission beam.

In some embodiments, at least one operation may be omitted from or added to the operations of FIG. 5, and the operations of FIG. 5 may be performed in reverse order or at the same time.

Figure 6:
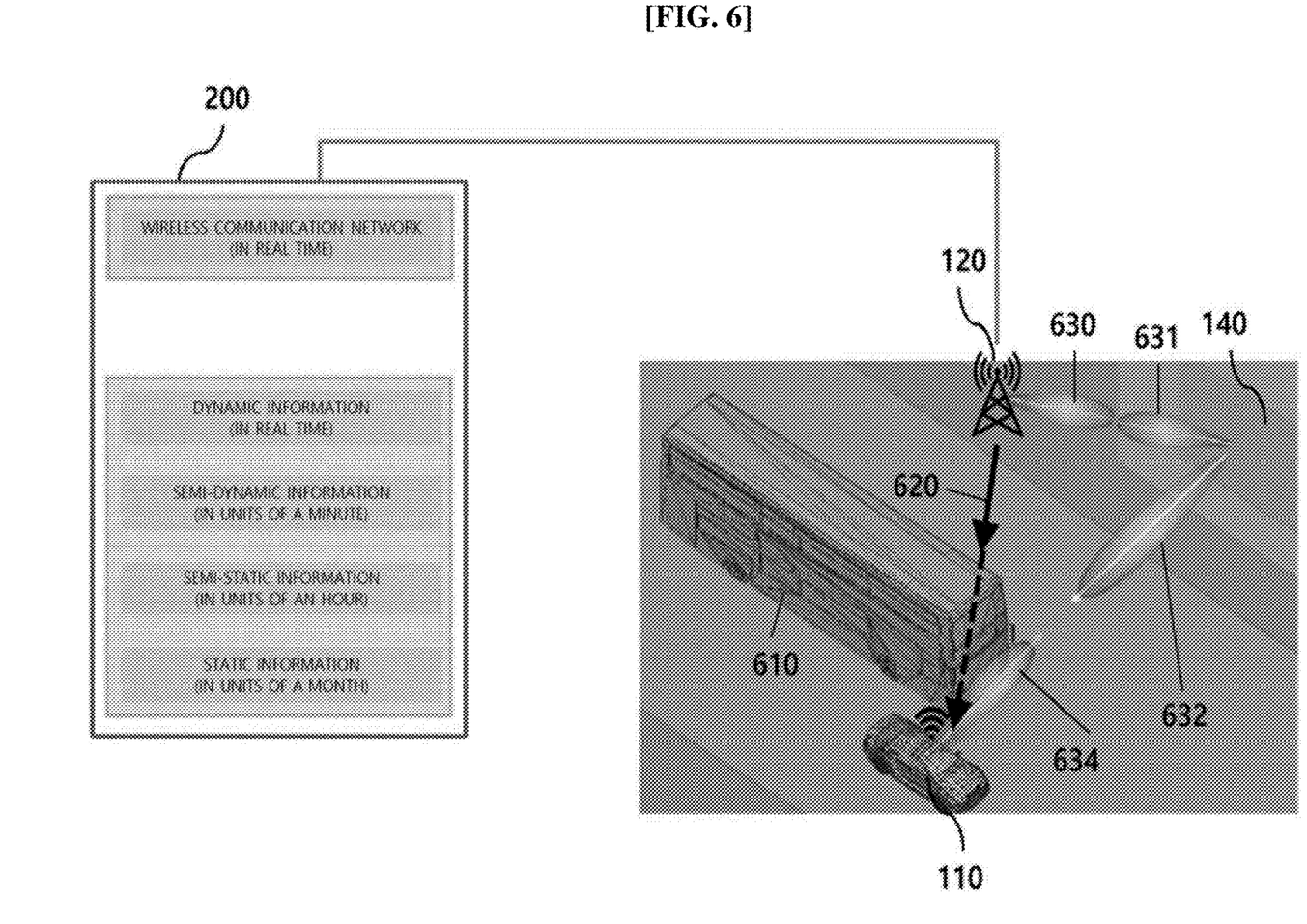
FIG. 6 is a diagram showing channel reconfiguration using LDM information according to an embodiment of the present invention.

FIG. 6 is a diagram showing channel reconfiguration using LDM information according to an embodiment of the present invention.

Referring to FIG. 6, the edge node 130 may transmit data with high reliability and low latency by predicting sudden channel distortion such as blocking of an LOS path 620 caused by a moving obstacle object 610 positioned between the base station node 120 and the mobile node 110, computing a reflective path configurable by a reflective node 140, and performing channel reconfiguration using moving state information of dynamic objects (e.g., the mobile node 110) belonging to the dynamic information layer of the LDM information 200 and beam graph information belonging to the communication network layer of the LDM information 200.

For example, the reflective node 140 may include an intelligent reflecting surface (IRS).

The edge node 130 may broadcast the LDM information, which is generated and updated in real time, to the base station node 120 and the mobile node 110.

The beam graph belonging to the wireless communication network layer of the LDM information 200 may include beam information that may be used in an LOS path between the base station node 120 and the mobile node 110 and beam information that may be used in a reflective path configurable by the reflective node 140.

In an embodiment, the edge node 130 may allow the base station node 120 and the mobile node 110 to perform beamforming in the LOS path between the base station node 120 and the mobile node 110 using the beam graph belonging to the wireless communication network layer of the LDM information 200.

In an embodiment, the edge node 130 may receive information such as the location, movement direction, and speed of an obstacle object 610 distributed near the base station node 120 and the mobile node 110 from the dynamic information layer of the LDM information 200 and may predict the trajectory of the obstacle object 610.

In an embodiment, when the movement trajectory predicted for the obstacle object 610 overlaps the LOS path 620 between the base station node 120 and the mobile node 110, the edge node 130 may predict the blocking of the LOS path 620 in consideration of size and height information of the obstacle object 610 included in the dynamic information layer.

In an embodiment, the edge node 130 may update the beam graph included in the wireless communication network layer of the LDM information 200 such that the beam graph indicates that the corresponding LOS path 620 has been blocked.

In an embodiment, the base station node 120 and the mobile node 110 may check blocking prediction for the LOS path 620 using the updated beam graph included in the wireless communication network layer of the LDM information 200 and search for a path capable of replacing the LOS path 620 using the beam graph.

In an embodiment, when there is no alternative LOS path that can be used in the beam graph included in the wireless communication network layer, the base station node 120 may select an optimal transmission beam 630 of the base station node 120, an optimal reception beam 631 of the reflective node 140, an optimal transmission beam of the reflective node 140, and an optimal reception beam 634 of the mobile node 110 which are usable for a reflective path configurable by the reflective node 140 using the beam graph and may deliver the selected beams to the reflective node 140 and the mobile node 110 through a control channel for wired or wireless communication.

In an embodiment, the mobile station node 110 selects an optimal transmission beam and a reception beam at each node from the mobile station node 110 to the base station node 130 via the reflective node 140, and may deliver the selected beams to the reflection node 140 and the base station node 110 through the control channel of the wired and wireless communication.

In an embodiment, the base station node 120, the mobile node 110, and the reflective node 140 may reconfigure a channel and transmit data using the optimal transmission beam 630 of the base station node 120, an optimal reception beam 631 of the reflective node 140, the optimal transmission beam 632 of the reflective node 140, and the optimal reception beam 634 of the mobile node 110 on the basis of optimal beam combination information.

In an embodiment, the base station node 120, the mobile node 110, and the reflective node 140 may reconfigure a channel and transmit data using the optimal transmission beam of the mobile node 110, an optimal reception beam of the reflective node 140, the optimal transmission beam of the reflective node 140, and the optimal reception beam of the base station node 120 on the basis of optimal beam combination information.

Figure 7:
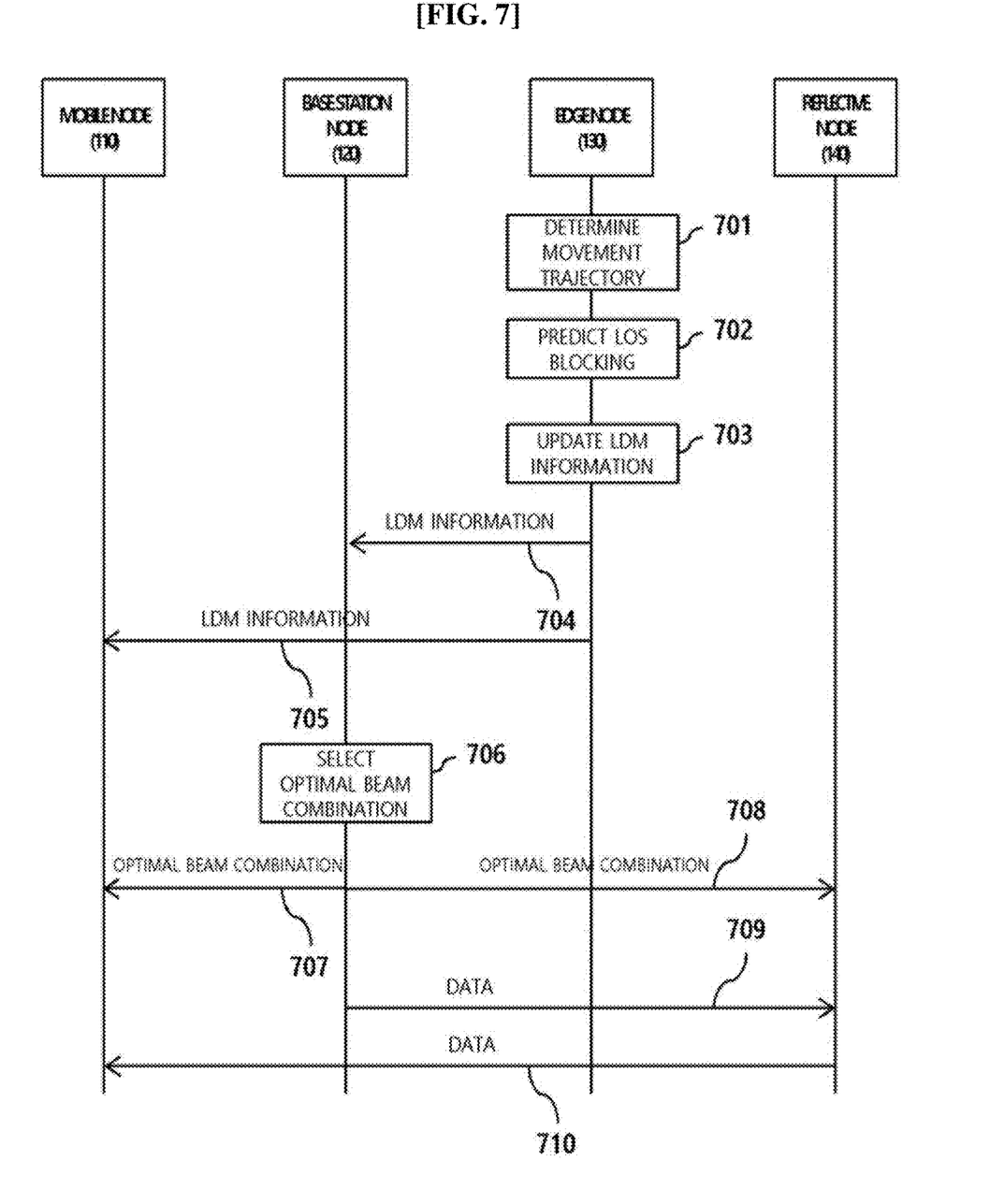
FIG. 7 is a diagram showing a signal flow for channel reconfiguration using LDM information according to an embodiment of the present invention.

FIG. 7 is a diagram showing a signal flow for channel reconfiguration using LDM information according to an embodiment of the present invention.

Referring to FIG. 7, in S701, an edge node 130 may determine the locations and movement trajectory of a base station node 120 and a mobile node 110.

In S702, the edge node 130 may predict blocking of an LOS path between the base station node 120 and the mobile node 110 on the basis of the locations and movement trajectories of the base station node 120 and the mobile node 110.

In S703, the edge node 130 may update the LDM information on the basis of the predicted blocking of the LOS path.

In S704, the edge node 130 may transmit the updated LDM information to the base station node 120.

In S705, the edge node 130 may transmit the updated LDM information to the mobile node 110.

In S706, the base station node 120 may select an optimal transmission/reception beam combination on the basis of the updated LDM information.

In an embodiment, the base station node 120 may select a reconfigured transmission beam 630 of the base station node 120, a reception beam 631 of the reflective node 140 corresponding to the reconfigured transmission beam 630, and a reconfigured reception beam 634 of the mobile node 110 corresponding to the transmission beam 632 of the reflective node 140 on the basis of the updated LDM information.

In S707, the base station node 120 may transmit the optimal transmission/reception beam combination to the mobile node 110. In an embodiment, the base station node 120 may transmit information on the reconfigured reception beam 634 of the mobile node 110 corresponding to the transmission beam 632 of the reflective node 140 to the mobile node 110.

In S708, the base station node 120 may transmit the optimal transmission/reception beam combination to the reflective node 140. In an embodiment, the base station node 120 may transmit information on the reception beam 631 of the reflective node 140 corresponding to the reconfigured transmission beam 630 of the base station node 120 to the reflective node 140.

In S709, the base station node 120 may transmit data to the reflective node 140 through the reconfigured transmission beam 630.

In S710, the reflective node 140 may transmit data to the mobile node 110 through the transmission beam 632 of the reflective node 140 corresponding to the reconfigured transmission beam 630. In this case, the mobile node 110 may receive data through the reconfigured reception beam 634.

In some embodiments, at least one operation may be omitted from or added to the operations of FIG. 7, and the operations of FIG. 7 may be performed in reverse order or at the same time.

Figure 8:
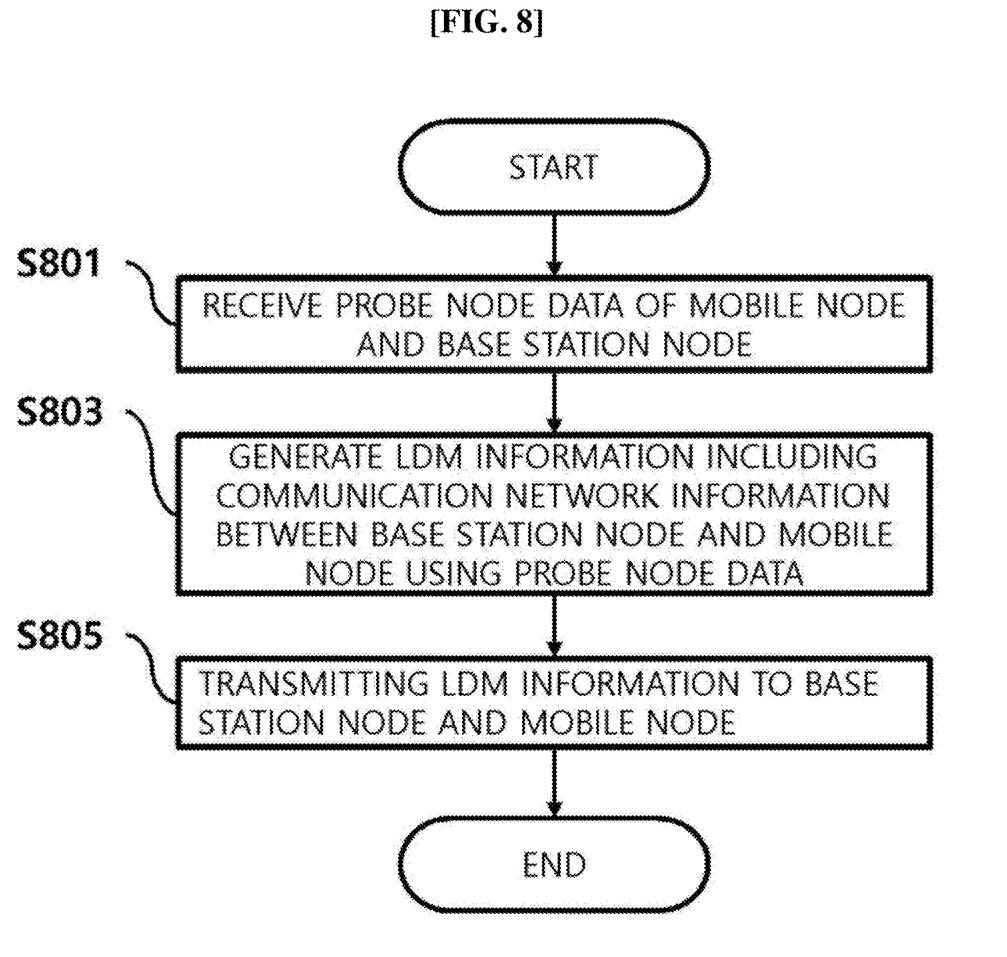
FIG. 8 is a diagram showing a method of performing wireless communication through channel state prediction using LDM information according to an embodiment of the present invention.

FIG. 8 is a diagram showing a method of performing wireless communication through channel state prediction using LDM information according to an embodiment of the present invention. In an embodiment, each operation of FIG. 8 may be performed by the edge node 130.

Referring to FIG. 8, in S801, probe node data of a base station node 120 and a mobile node 110 is received.

In an embodiment, the probe node data may include at least one of location information, direction information, and speed information of the base station node 120 and the mobile node 110 and at least one of number information, direction information, and gain information of a candidate transmission beam of the base station node 120 and a candidate reception beam of the mobile node 110.

In S803, LDM information including communication network information between the base station node 120 and the mobile node 110 is generated using the probe node data.

In an embodiment, a radio map displaying the locations and movement trajectories of the base station node 120 and the mobile node 110 and geographical signal power spectrum density caused by the beamforming of the base station node 120 and the mobile node 110 may be generated using the probe node data.

In an embodiment, a beam graph including transmission/reception beam combination information and communication link state information for the transmission/reception beam combination information may be generated using the radio map.

In an embodiment, LDM information including the radio map and the beam graph may be generated.

In S805, the LDM information is transmitted to the base station node 120 and the mobile node 110. In an embodiment, the LDM information may be used to select a transmission beam of the base station node 120 and a reception beam of the mobile node 110 corresponding to the transmission node or a reception beam of the base station node 120 and a transmission beam of the mobile node 110 corresponding to the reception beam of the base station node 120.

In an embodiment, the LDM information may comprise static information comprising 3D precision map and dynamic information comprising moving state of moving objects and may be updated according to a predetermined time cycle.

In an embodiment, after S805, the locations and movement trajectories of the base station node 120 and the mobile node 110 may be determined using the probe node data.

In an embodiment, blocking of an LOS path between the base station node 120 and the mobile node 110 may be predicted based on the locations and the movement trajectories.

In an embodiment, the LDM information may be updated based on the predicted blocking of the LOS path. In this case, the updated LDM information may be used to select a reconfigured transmission beam of the base station node 120 to the reflective node 140, a reception beam of the reflective node 140 corresponding to the reconfigured transmission beam, and a reconfigured reception beam of the mobile node 110 corresponding to the transmission beam of the reflective node 140.

In an embodiment, the updated LDM information may be used to select a reconfigured transmission beam of the mobile node 110 to the reflective node 140, a reception beam of the reflective node 140 corresponding to the reconfigured transmission beam, and a reconfigured reception beam of the base station node 120 corresponding to the transmission beam of the reflective node 140.

Figure 9:
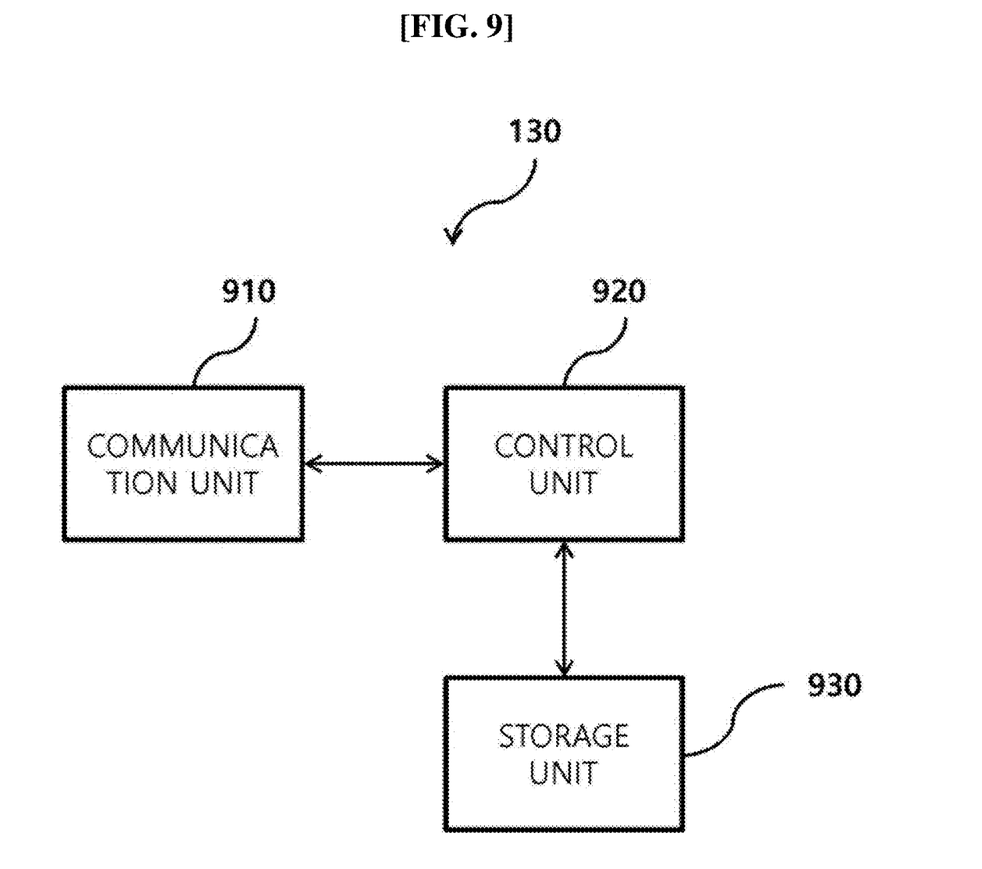
FIG. 9 is a diagram showing a functional configuration of an apparatus for performing wireless communication through channel state prediction using LDM information according to an embodiment of the present invention.

FIG. 9 is a diagram showing a functional configuration of an edge node apparatus 130 for performing wireless communication through channel state prediction using LDM information according to an embodiment of the present invention.

Referring to FIG. 9, the edge node apparatus 130 may include a communication unit 910, a control unit 920, and a storage unit 930.

The communication unit 910 may receive probe node data of a base station node 120 and a mobile node 110.

In an embodiment, the communication unit 910 may include at least one of a wired communication module and a wireless communication module. All or part of the communication unit 910 may be referred to as a "transmitter," "receiver," or "transceiver."

The control unit 920 may generate LDM information including communication network information between the base station node 120 and the mobile node 110 using the probe node data.

In an embodiment, the communication unit 910 may transmit the LDM information to the base station node 120 and the mobile node 110. In this case, the LDM information may be used to select a transmission beam of the base station node 120 and a reception beam of the mobile node 110 corresponding to the transmission node or a reception beam of the base station node 120 and a transmission beam of the mobile node 110 corresponding to the reception beam of the base station node 120.

In an embodiment, the control unit 920 may include at least one processor or microprocessor or may be a portion of the processor. Also, the control unit 920 may be referred to as a communication processor (CP). The control unit 920 may control the operation of the edge node apparatus 130 according to various embodiments of the present invention.

The storage unit 930 may store the probe node data of the mobile node 110. In an embodiment, the storage unit 930 may store the LDM information including the communication network information.

In an embodiment, the storage unit 930 may be a volatile memory, a non-volatile memory, or a combination of a volatile memory and a non-volatile memory. Also, the storage unit 930 may provide stored data according to a request from the control unit 920.

Referring to FIG. 9, the edge node apparatus 130 may include the communication unit 910, the control unit 920, and the storage unit 930. In various embodiments of the present invention, the elements described with reference to FIG. 9 are not essential, and thus the edge node apparatus 130 may be implemented to have more or fewer elements than as shown therein.

According to an embodiment of the present invention, it is possible to predict a channel state between a base station node and a mobile node and avoid channel distortion occurring between the base station node and the mobile node not using conventional propagation resources of time and frequency but using local dynamic map information.

Advantageous effects of the present invention are not limited to the aforementioned effects, and potential effects expected by the technical features of the present invention will be clearly understood from the following description.

The above description is only illustrative of the technical spirit of the present invention, and those skilled in the art will appreciate that various alterations and modifications are possible without departing from the essential features of the invention.

The various embodiments disclosed herein may be performed in any order and may be performed simultaneously or separately.

In an embodiment, at least one operation may be omitted from or added to the operations of each drawing described herein, and the operations may be performed in reverse order or at the same time.

Therefore, the embodiments disclosed herein are intended not to limit but to describe the technical spirit of the present invention, and the scope of the present invention is not limited to the embodiments.

The scope of the invention should be construed by the appended claims, and all technical spirits within the scopes of their equivalents should be construed as being included in the scope of the invention.

What is claimed is:

1. A method of performing wireless communication through channel state prediction using a local dynamic map, the method comprising:
   (a) receiving probe node data (PND) of a base station node and a mobile node;
   (b) generating local dynamic map (LDM) information including communication network information between the base station node and the mobile node using the probe node data; and
   (c) transmitting the LDM information to the base station node and the mobile node,
   wherein the LDM information is used to select a transmission beam of the base station node and a reception beam of the mobile node corresponding to the transmission beam or a reception beam of the base station node and a transmission beam of the mobile node corresponding to the reception beam.

2. The method of claim 1, wherein the probe node data includes at least one of location information, direction information, and speed information of the base station node and the mobile node and at least one of number information, direction information, and gain information of a candidate transmission beam of the base station node and a candidate reception beam of the mobile node.

3. The method of claim 1, wherein operation (b) comprises:
   generating a radio map displaying locations and movement trajectories of the base station node and the mobile node and geographical signal power spectrum density caused by beamforming of the base station node and the mobile node using the probe node data;
   generating a beam graph including transmission/reception beam combination information and communication link state information for the transmission/reception beam combination information using the radio map; and
   generating LDM information including the radio map and the beam graph.

4. The method of claim 1, wherein the LDM information comprises static information comprising 3D precision map and dynamic information comprising moving state of moving objects and is updated according to a predetermined time cycle.

5. The method of claim 1, further comprising, after operation (c):
   determining locations and movement trajectories of the base station node and the mobile node using the probe node data;
   predicting blocking of a line of sight (LOS) path between the base station node and the mobile node on the basis of the locations and the movement trajectories; and
   updating the LDM information on the basis of the predicted blocking of the LOS path.

6. The method of claim 5, wherein the updated LDM information is used to select a reconfigured transmission beam of the base station node to a reflective node, a reception beam of the reflective node corresponding to the reconfigured transmission beam, and a reconfigured reception beam of the mobile node corresponding to the transmission beam of the reflective node.

7. The method of claim 5, wherein the updated LDM information is used to select a reconfigured transmission beam of the mobile node to a reflective node, a reception beam of the reflective node corresponding to the reconfigured transmission beam, and a reconfigured reception beam of the base station node corresponding to the transmission beam of the reflective node.

8. An apparatus for performing wireless communication through channel state prediction using a local dynamic map, the apparatus comprising:
   a communication unit configured to receive probe node data (PND) of a base station node and a mobile node; and
   a control unit configured to generate local dynamic map (LDM) information including communication network information between the base station node and the mobile node using the probe node data,
   wherein
   the communication unit transmits the LDM information to the base station node and the mobile node, and
   the LDM information is used to select a transmission beam of the base station node and a reception beam of the mobile node corresponding to the transmission beam or a reception beam of the base station node and a transmission beam of the mobile node corresponding to the reception beam.

9. The apparatus of claim 8, wherein the probe node data includes at least one of location information, direction information, and speed information of the base station node and the mobile node and at least one of number information, direction information, and gain information of a candidate transmission beam of the base station node and a candidate reception beam of the mobile node.

10. The apparatus of claim 8, wherein the control unit is configured to:
    generate a radio map displaying locations and movement trajectories of the base station node and the mobile node and geographical signal power spectrum density caused by beamforming of the base station node and the mobile node using the probe node data,
    generate a beam graph including transmission/reception beam combination information and communication link state information for the transmission/reception beam combination information using the radio map, and
    generate LDM information including the radio map and the beam graph.

11. The apparatus of claim 8, wherein the LDM information comprises static information comprising 3D precision map and dynamic information comprising moving state of moving objects and is updated according to a predetermined time cycle.

12. The apparatus of claim 8, wherein the control unit is configured to:
    determine locations and movement trajectories of the base station node and the mobile node using the probe node data,
    predict blocking of a line of sight (LOS) path between the base station node and the mobile node on the basis of the locations and the movement trajectories, and
    update the LDM information on the basis of the predicted blocking of the LOS path.

13. The apparatus of claim 12, wherein the updated LDM information is used to select a reconfigured transmission beam of the base station node to a reflective node, a reception beam of the reflective node corresponding to the reconfigured transmission beam, and a reconfigured reception beam of the mobile node corresponding to the transmission beam of the reflective node.

14. The apparatus of claim 12, wherein the updated LDM information is used to select a reconfigured transmission beam of the mobile node to a reflective node, a reception beam of the reflective node corresponding to the reconfigured transmission beam, and a reconfigured reception beam of the base station node corresponding to the transmission beam of the reflective node.

* * * * *